United States Patent

Fannin

[15] 3,651,896
[45] Mar. 28, 1972

[54] HYDRAULIC DISK BRAKE WITH MECHANICAL ACTUATOR

[72] Inventor: Chester N. Fannin, Troy, Ohio

[73] Assignee: The Dayton Steel Foundry Company, Dayton, Ohio

[22] Filed: June 19, 1970

[21] Appl. No.: 47,780

[52] U.S. Cl. ........................... 188/71.8, 188/72.6, 188/170, 188/196 B
[51] Int. Cl. ........................................... F16d 65/52
[58] Field of Search ................... 188/71.8, 72.4, 72.5, 72.6, 188/72.9, 72.7, 106 F, 196 B, 170

[56] References Cited

UNITED STATES PATENTS

| | | |
|---|---|---|
| 3,318,421 | 9/1967 | House et al. ........................... 188/106 F |
| 3,342,291 | 9/1967 | Warwick et al. ........................ 188/71.8 |
| 3,554,331 | 1/1971 | Pollinger ............................. 188/170 X |
| 3,459,282 | 8/1969 | Hoenick et al. ........................ 188/196 B |
| 3,547,229 | 12/1970 | Pollinger ........................... 188/106 F X |

FOREIGN PATENTS OR APPLICATIONS

| | | |
|---|---|---|
| 1,217,808 | 5/1966 | Germany ............................. 188/71.8 |
| 373,269 | 12/1963 | Switzerland ......................... 188/170 |

Primary Examiner—George E. A. Halvosa
Attorney—Marechal, Biebel, French & Bugg

[57] ABSTRACT

A caliper type disk brake includes a mechanical actuator which operates independently of the hydraulic pistons and incorporates a pressure plate which is supported on the pistons and a centrally disposed actuator plunger. The actuator plunger incorporates a mechanical adjuster for taking up slack in the actuator.

6 Claims, 9 Drawing Figures

INVENTOR
CHARLES N. FANNIN

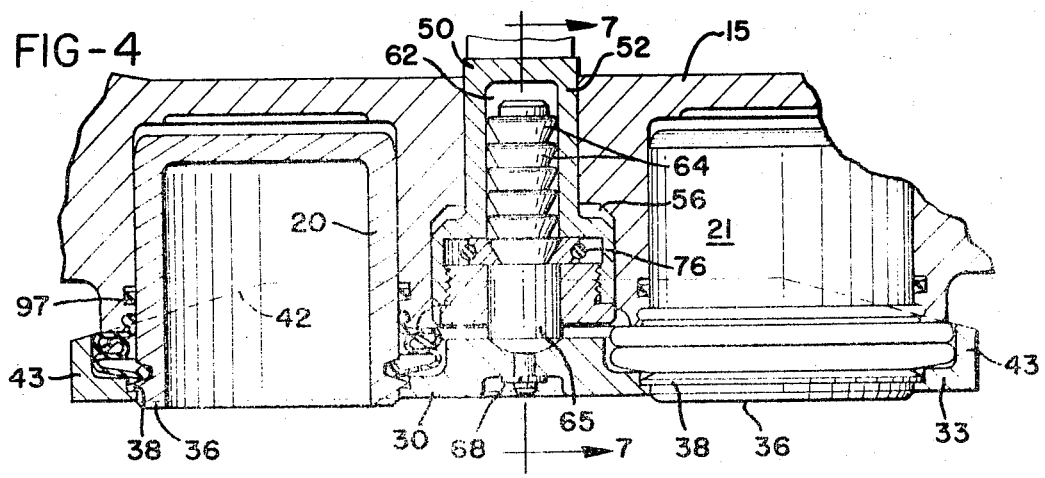
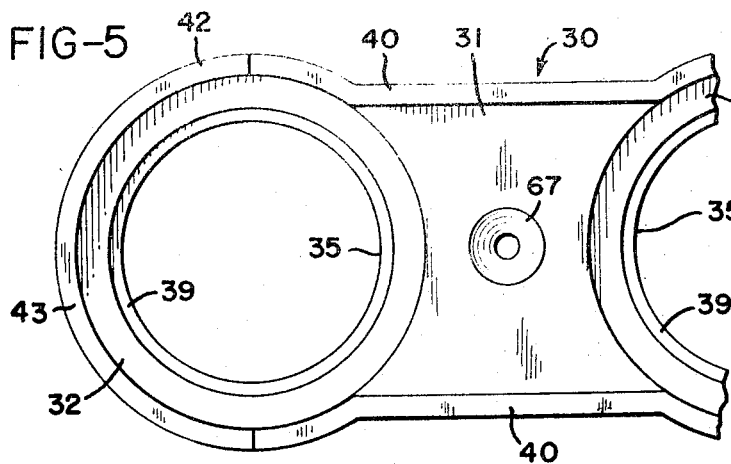
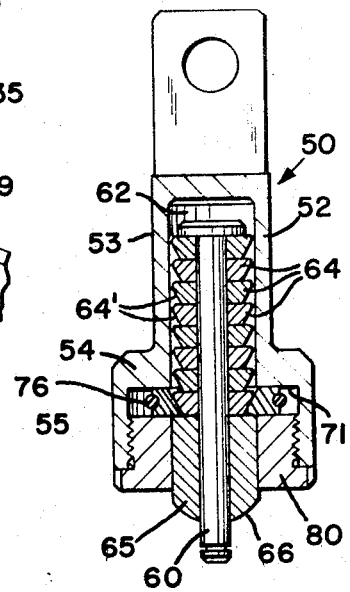
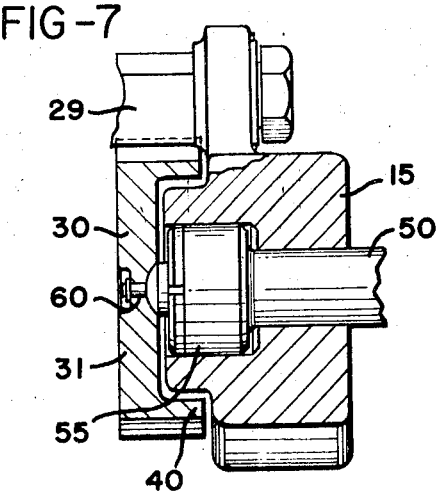
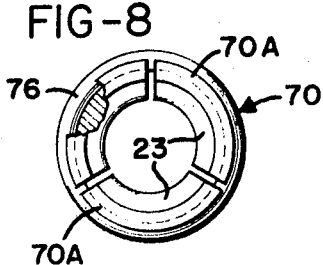

HYDRAULIC DISK BRAKE WITH MECHANICAL ACTUATOR

BACKGROUND OF THE INVENTION

Hydraulic disk brakes, particularly those intended for use on heavy duty vehicles, require an emergency parking system separate from the hydraulic actuation which is effective to stop and hold the vehicle in the event of complete failure of the regular braking system. Further, such brakes require an independent parking capability.

Various attempts have been made to provide emergency brake capability in caliper type brakes. In some instances, the entire caliper housing is moved, as for example in U.S. Pat. No. 3,460,651. In other instances, braking force is applied through the hydraulic piston, as shown for example in U.S. Pat. Nos. 3,498,421 and 3,269,490.

SUMMARY OF THE INVENTION

The present invention is directed to an improved emergency brake system which operates independently of the hydraulic system to apply a braking force to the friction pads, For this purpose, a pressure plate is positioned adjacent the pads and is supported by the piston units but is movable by mechanical actuation separately from the piston units. The operator includes a push pin or plunger which is positioned generally centrally of the caliper housing between a pair of adjacent piston units, and is movable axially to apply a braking force to the pressure plate. The plunger incorporates an automatic slack adjuster which is maintained in adjustment by the normal operation of the hydraulic piston units.

An additional feature of the invention resides in the construction of the mechanical automatic adjusting mechanism for the emergency brake. A hollow plunger, comprising the force transmitting means, is guided within the caliper housing. A pin is received within the plunger and carries means defining an axial series of steps or detents which may consist of individually stepped or tapered washers mounted on the pin. A detent retainer is received within the plunger and comprises a split ring which has an inner cam surface engageable with a selected one of the axially aligned washers. The split ring is maintained in engagement by a surrounding elastomeric or spring member, such as an O-ring

BRIEF DESCRIPTION OF THE DRAWINGS

FIG. 4 is an enlarged transverse section through the piston housing showing the automatic mechanical brake adjuster mechanism taken generally along the line 4—4 of FIG. 1;

FIG. 5 is an enlarged fragmentary elevation looking inside the pressure plate;

FIG. 6 is a cross-sectional view through the mechanical brake actuator plunger;

FIG. 7 is a fragmentary vertical section through the piston housing and pressure plate, on a reduced scale, taken generally along the line 7—7 of FIG. 4;

FIG. 8 is a fragmentary detail of the detent retaining ring of the actuator of FIGS. 4 and 6.

DESCRIPTION OF PREFERRED EMBODIMENT

Figure 1:
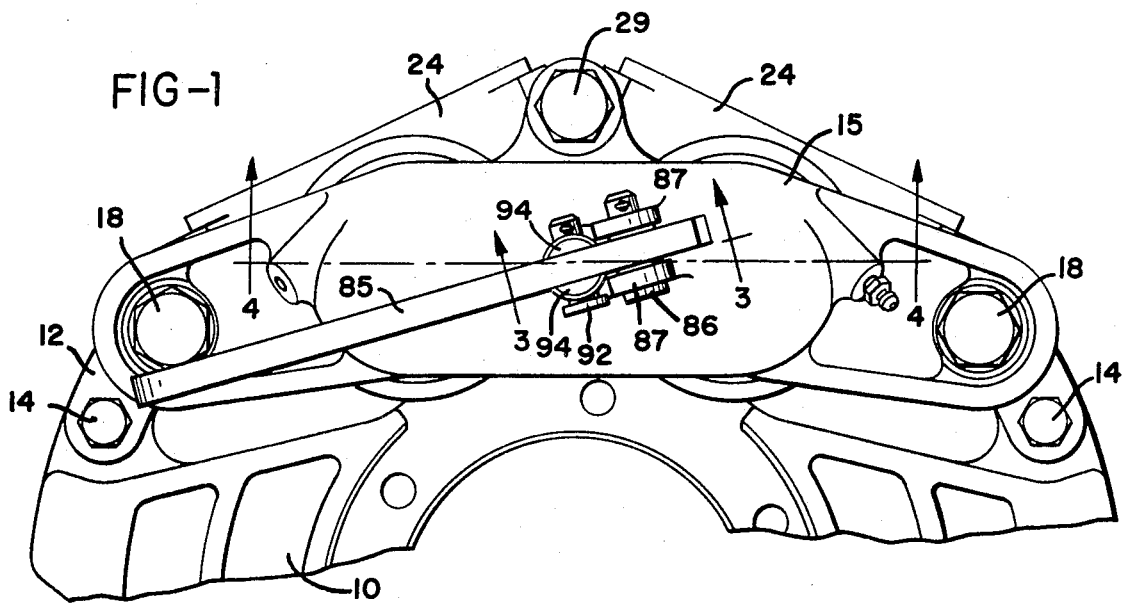
FIG. 1 is a fragmentary view of a disk brake constructed according to this invention.

A hydraulic disk brake in which the present invention is applied is illustrated in FIG. 1 as incorporating a fixed torque member 10 on which a caliper 12 is mounted for generally axial movement. The torque member 10 and the caliper 12 may be constructed and mounted generally in the manner shown in the U.S. Pat. of Walther et al., No. 3,384,203. To this end, the caliper 12 is mounted on the torque member 10 by means of a pair of axial pins 14 providing for limited axial movement. Resilient supporting and centering means may be incorporated on the pins 14 in the manner shown in the U.S. Pat. of Walther No. 3,482,655.

Figure 2:
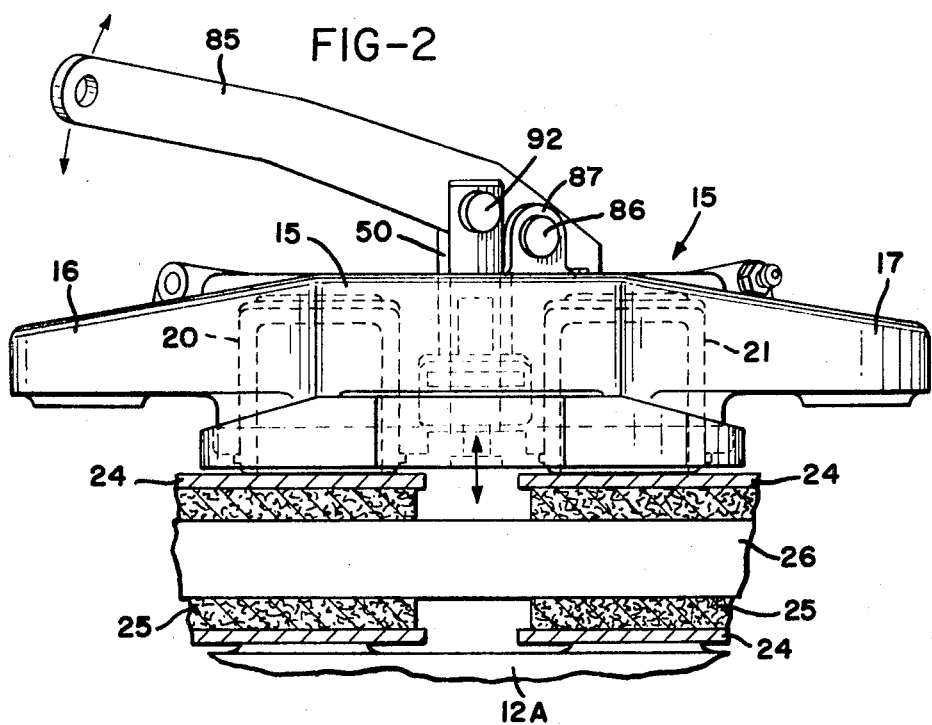
FIG. 2 is a bottom view of the caliper housing of FIG. 1 and further showing the relative location of the friction pads and disk.

The caliper brake of the present invention includes a hydraulic pressure housing or unit 15, FIGS. 1 and 2, formed with transversely outwardly extending arms 16 and 17 and mounted on the caliper 12 by means of a pair of bolts 18 (FIG. 1). The housing 15 is formed with a pair of adjacent side-by-side axial bores receiving hydraulic pistons 20 and 21 as shown in FIGS. 2 and 4. The hydraulic piston units 21 and 22 apply an axial braking force to adjacent friction pad units which comprise backing plates 24 and friction pads 25. There are a corresponding set of plates 24 and pads 25 on the opposite side of the disk 26, as shown in FIG. 2, retained by the reaction side 12a of the caliper 12. In the preferred embodiment, there is provided a torque bar 29 (FIG. 1) positioned generally cordwise between the adjacent pairs of backing plates 24 for receiving the torque therefrom in the manner shown in the pending application of Fannin et al. Ser. No. 871,476, filed Oct. 21, 1969, and assigned to the same assignee as this invention. Alternatively, single backing plates and pads may be provided as shown, for example, in U.S. Pat. No. 3,482,655, or in U.S. Pat. No. 3,349,871, each assigned to the same assignee as this invention.

The present invention provides an automatic adjusting and mechanical operating emergency and parking brake. For this purpose, there is provided an auxiliary pressure plate 30 positioned on the pressure side of the caliper between the hydraulic piston housing 15 and the adjacent backing plates 24. The pressure plate 30, as best shown in FIGS. 4 and 5, includes a central portion 31 of substantial thickness and a pair of piston receiving ends 32 and 33 of somewhat reduced axial thickness.

Each of the plate ends 32 and 33 is formed with a piston receiving aperture or opening 35. As best shown in FIG. 4, the ends 36 of the pistons 20 and 21 protrude through one of the openings 35 to engage the adjacent plate 24. Each piston is provided with peripheral flange 38 which seats on a corresponding surface 39 of the plate 30, so that the piston end 36 protrudes slightly therethrough.

The plate 30 is further formed with side flanges 40 of substantial axial depth at the chordwise central region of the plate which flanges taper, as indicated by the broken lines 42 in FIG. 4, to end flanges 43. The flanged construction provides a plate with substantial mechanical rigidity so that a force applied to its chordwise center results in minimum deflection or bending of the plate, with the result that this force is transmitted directly to the adjacent backing plates 24. While the plate 30 normally rests on the exposed ends 36 of the pistons 20 and 21, an axial braking force applied to the plate results in braking movement of the plate 30 separately and independently of the piston units.

Mechanical plate operator means comprises a push pin or plunger means indicated generally at 50 in FIG. 4 and 6. The plunger means comprises a hollow outer plunger 52 which has an outer cylindrical surface 53 received within an axial bore formed centrally of the housing 15 between the piston units 20 and 21. The plunger 50 is further formed with an enlarged inner end 54 which likewise is formed with an outer cylindrical surface 55 received within a correspondingly enlarged counterbore 56 within the housing 15. The surfaces 53 and 55 guide the plunger unit 50 for axial movement within the housing 15.

Automatic adjusting force transmitting means within the plunger 50 includes a headed pin 60 received within a cylindrical cavity 62 formed within the plunger 50. The pin 60 supports means defining a series of axially spaced stops or detents and, for this purpose, includes a stack formed of a plurality of identical washers 64. The washers 64 are formed with tapered peripheral surfaces 64′ which define a step-by-step adjustment. A plunger sleeve 65 has a spherical outer surface and is also threaded on the pin in abutment with the stack of washers. The surface 66 is proportioned to seat within a corresponding surface 67 formed centrally in the central portion 31 of the plate 30. The end of the pin 60 is secured to the plate 30 by a snap ring 68, or other suitable fastener.

Detent surface engaging means associated with the plunger 50 comprises a split ring 70 (FIG. 8) received within a counterbore 71 formed in the enlarged end 54. The ring 70 may be divided into two or more sections, and is shown in FIG. 8 as being split in three identical arcuate segments 70a each of approximately 120°. The ring 70 is formed with an inner tapered surface 73 which mates with one of the correspondingly tapered detent surfaces 64' formed on the washers 64. Bias means for urging the individual segments of the ring 70 into engagement with the outer surface of one of the washers 64 comprises an annular elastic retainer member 76 which may be a garter spring or an O-ring received within a peripheral groove formed in the ring 70.

The detent and axial adjustment mechanism formed by the ring 70 and the washers 64 are retained in place by a collar 80 received over the plunger 65 and threaded into the enlarged end 54. Sufficient axial movement of the pin 60 from the plunger 50 applies a camming force to the ring 70 so that the ring drops into the next adjacent detent formed by a washer 64.

Figure 3:
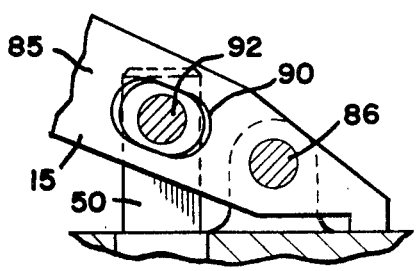
FIG. 3 is an enlarged fragmentary detail of the actuator arm and support taken generally along the line 3—3 of FIG. 1.

Actuator means for applying a braking force to the plunger 50 includes an actuator arm 85 (FIGS. 1 and 2) which is pivotally mounted on a pin 86 extending between support bosses 87 on the housing 15. The arm 85 is internally slotted at 90 in FIG. 3 and receives therein a pin 92 which extends between the external bifurcated portions 94 and 95 of the plunger 50. Thus rocking movement of the arm 85 on the pin 86 is translated to an axial force applied by the pin 92 to the plunger 50.

In use, the arm 85 may be spring biased to the brake applying position and may be retracted by a suitable hydraulic or air piston. During normal operation of the brakes, the piston units 20 and 21 move axially in the conventional manner and apply a braking force to the backing plates 24. In so doing, these pistons carry the auxiliary plate 30 with them. The plate 30 is coupled to the plunger 50 by means of the pin 60 so that braking movement is accompanied by some axial movement of the pin 60 and a corresponding expansion of the ring 70. When the brake is released, these parts return to their normal position and the pistons are retracted by any conventional means, such as by the tapered sealing rings 97 and by the elastomeric housing support (not shown) on the pins 14.

As the lining 25 wears, the braking movement of the plate 30 will cause the ring 70 to be repositioned axially into successive detents. The axial space between adjacent detects, defined by the thickness of the washers 64 is less than the total normal retraction movement effected by the rings 97 and the centering action of the caliper on the caliper support or torque member 10 so as not to leave the brake in a dragging condition upon the occurrence of an adjustment. In this manner, the plate 30 remains associated with the piston 20 and 21 as the lining pads wear, accompanied by a corresponding lengthening of the plunger member 50, so that substantially no slack exists in the emergency brake mechanism.

When it is desired to apply the emergency brake, the lever 85 is rotated toward the housing 15 to effect axial displacement of the plunger 50. This force is transmitted through the surface 66 to the center of the plate 30, and since the plate is free to move in the force applying direction apart from the pistons 20 and 21, the back surface of this plate applies a braking force to the adjacent friction pads. The axial aligning movement of the caliper housing applies an opposite reaction force to the opposite pads.

Figure 9:
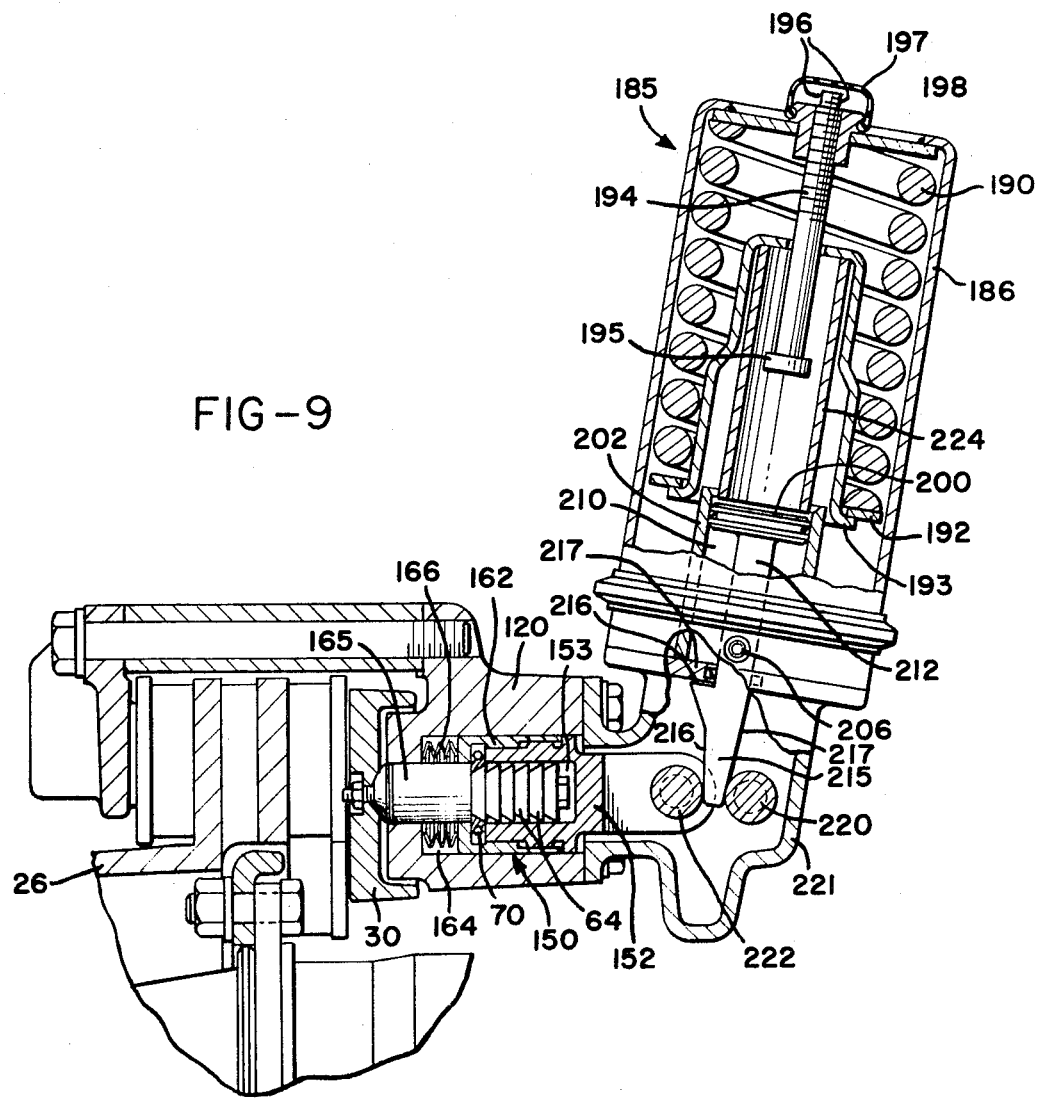
FIG. 9 is a sectional view of a modified form of the invention.

FIG. 9 represents a somewhat modified form of the brake actuator mechanism and also shows an emergency actuator device which may be used in lieu of the lever arm 85. Wherever practical like reference numerals are used for like parts.

A slightly modified form of a caliper 120 is shown but for the purposes of the present invention the general operation of this caliper may be considered as being identical to that of the caliper 12. The emergency brake actuating plunger mechanism indicated generally at 150 differs in certain respects from the plunger mechanism 50 of FIGS. 1-8, although many of the same parts are used. The mechanism 150 includes an inner body portion 152 formed with an internal forward opening cavity 153 which receives the pin 60 and the stacked tapered washers 64 thereon. The retainer means for the split ring 70 comprises an outer threaded sleeve 162 threaded into the portion 152. The sleeve has an outer cylindrical surface slidably received within a rearwardly opening counterbore 164 in the caliper 120.

A somewhat elongated plunger 165 is mounted on the pin 60 and extends through an opening in the caliper into engagement with the recess in the back of the plate 30. A series of Belleville retraction or release springs 166 are positioned between the closed end of the counterbore 164 and the adjacent abutting surface of the sleeve 162.

A spring biased actuator indicated generally at 185 may be used in lieu of the lever arm 85 to provide for positive actuation of the emergency braking system in the event of hydraulic pressure loss or intentional pressure release. To this end, a cylindrical elongated housing 186 receives a brake actuator spring 190 therein. The lower end of the spring 190 is received on a flat washer 192 which rests within one end of an elongated saddle 193. A stop bolt 194 has a head 195 received within the saddle 193 and is threaded into the end 196 of the housing 185. The bolt 194 defines the extent of movement of the spring and saddle in the actuating direction. The upper exposed end of the bolt 194 is formed with a flat 196 permitting the bolt to be rotated with the sealing gasket 197 removed and may thus be used to retract and compress the spring 190 during initial installation of the unit 185 on the brake.

Means for controlling the application of force from the spring 190 to the mechanism 150 includes a hydraulic piston 200 received within the housing 186 within an inner cylindrical sleeve 202. The sleeve 202 has an outside diameter which is less than the inside diameter of the saddle 193 so that the saddle 193 can move over the sleeve 202 during actuation by the spring 190. A tubular force transmitting member 204 connects the piston 200 to the saddle 193 and has one end in abutment with the piston 200 and has its other end received within the saddle 193.

Means for applying hydraulic pressure to the piston 200 includes an inlet 206 formed in the housing 186 leading into the space or chamber 210 behind the piston 200 in such a manner that hydraulic pressure serves to move the piston 200 inwardly, resulting in compression of the spring 190. A piston rod 212 connects with the piston 200 and supports on its end a wedge or cam 215. An abrupt back surface 216 of the cam 215 engages the cylinder wall 217 and defines the inner or retracted position of the piston 200.

The cam 215 operates between a fixed position roller 220 carried on the lower end 221 of the housing 186 and a roller 222 carried on the extended end of the body portion 152. The cam 215 has a sloping working surface 216 formed at an angle with the back surface 217. The back surface of the cam is parallel with the axis of the rod 212, while the cam surface 216 is chosen with an angle so as to provide a desired mechanical advantage. The mechanical advantage provided by the ramp angle depends upon the available spring force and the amount of brake thrust which is desired. When the hydraulic pressure is released from the chamber 212, the cam 215 is moved between the rollers 220 and 222 under the influence of the spring 190, resulting in an axial brake-applying thrust or force being applied through the mechanism 150 to the plate 30 to actuate the parking brake.

As an example, two rear brakes made according to this invention may be designed to hold a vehicle with a 25,000 pound axial load on a 20 percent grade. The same brake may be designed to provide a deceleration of 6 feet per second$^2$ at 20 m.p.h. The spring 190 may, in this example, provide a minimum force of 1,500 pounds. With a mechanical advantage of approximately 5.5 to 1, an 8,000 pound thrust may be applied to the plate 30. For this purpose, the slope of the surface 216 may be in the order of 11° over its working surface.

When it is desired to release the parking brake, hydraulic fluid under pressure is applied to the inlet 206 from the vehicle's power boost system. This moves the piston to the position shown in FIG. 9, and the plate 30 is retracted by reason of the release springs 166. Automatic adjustment of the relative position of the plunger 165 with respect to the member 152 is accomplished by the operation of the ring 70 with respect to the inclined detent surfaces of the washers 64, in the manner previously described in connection with the embodiment of FIGS. 1–8.

It is therefore seen that this invention provides a simple, dependable and automatically adjusting mechanism actuator for disk type brakes. The operation of the mechanical actuator is entirely independent of the operation of the hydraulic piston 20 and 21 and will serve to apply the brake in the event of jamming or malfunction of one of these pistons.

The construction is one in which the mechanism may be easily reset when the linings are changed, it being only necessary to remove the member 80 or 162 and reset the ring 70 to its inner position as shown in FIGS. 6 and 9.

The actuator mechanism 185 of FIG. 9 has particular advantage in that it is enclosed and sealed against dirt and contamination and is wholly self-contained and is accordingly not dependent on external linkages or force applying arrangements. The force applied by the spring 190 through the cam 215 is calculated to be sufficient to provide a brake applying force which is equivalent to a moderate application of the hydraulic system, to provide ample stopping power in the event of loss of hydraulic pressure and to provide an automatic parking function.

While the form of apparatus herein described constitutes a preferred embodiment of the invention, it is to be understood that this invention is not limited to this precise form of apparatus, and that changes may be made therein without departing from the scope of the invention which is defined in the appended claims.

What is claimed is:

1. An automatic adjusting mechanical parking brake for a hydraulic caliper-type disk brake in which a caliper housing encircles a portion of the disk and includes backing plates and attached pads of friction material positioned at opposite sides of the disk within the housing for frictional engagement within the disk upon the application of hydraulic pressure, comprising a pair of piston units positioned at one side of said housing and arranged to apply a direct braking force to adjacent said backing plates, an intermediate pressure plate positioned adjacent said piston units and mounted for axial movement into force-applying relation to said adjacent backing plates independently of the movement of said piston units, means positively connecting said piston units to said pressure plate so that movement of said piston units in the brake-applying direction also causes movement of said pressure plate in the same direction, mechanical actuator means for said pressure plate being operable independently of said piston units and movably mounted on said housing between said piston units, said mechanical actuator means having first and second portions with one of said portions being connected for movement with said plate and the other of said portions being exposed exteriorly of said housing, actuator means connected to said other portion for effecting generally axially movement thereof, and one way detent means operable between said first and second portions and permitting axial separation thereof into a series of preselected positions for automatically taking up slack with movement of said pressure plate by said piston units.

2. An automatic adjusting mechanical parking brake for a hydraulic caliper-type disk brake in which a caliper housing encircles a portion of the disk and includes backing plates and attached pads of friction material positioned at opposite sides of the disk within the housing for frictional engagement within the disk upon the application of hydraulic pressure, comprising a pair of piston units positioned at one side of said housing and arranged to apply a direct braking force to the adjacent said backing plates, an intermediate pressure plate positioned adjacent said piston units and mounted for axial movement into direct force-applying relation to said adjacent backing plates independently of the movement of said piston units, means positively connecting said piston units to said pressure plate so that movement of said piston units in the brake-applying direction also causes movement of said pressure plate in the same direction, mechanical actuator means for said pressure plate being operable independently of said piston units and movably mounted on said housing between said piston units, said mechanical actuator means being selectively axially extensible to compensate for wear of the friction pads, and means connecting said pressure plate to said mechanical actuator so that extension thereof is effected by said piston units to compensate for wear of said friction material.

3. The brake of claim 2 in which said pressure plate is formed with means defining a pair of openings in alignment with said piston units, and in which said piston units have portions which extend through said plate openings into engagement with said backing plates.

4. In a disk brake having a caliper housing arranged in encircling relation to a peripheral portion of a brake disk, a pair of hydraulic piston units positioned in side-by-side relation in one side of said caliper housing, and friction pad means positioned between said piston units and said disk being subject to braking force applied by said piston units, the improvement in mechanical parking brake structure comprising a pressure plate separate from said pad means and positioned on said housing adjacent said pad means, said pressure plate being movable independently of said piston units into braking force-applying relation to said pad means, a plate operator including plunger means positioned in said caliper housing between said piston units and axially movable with respect to said housing, said plunger means having one end thereof connected to said plate, actuating means for effecting axial movement of said operator to apply a brake-applying force to said plate, said operator having means selectively coupling it with respect to said actuating means to permit axial repositioning of said plunger means with respect to said actuating means to compensate for wearing of said pad means, and positive coupling means connecting at least one of said piston units to said plate when said one piston unit is moving in the brake-applying direction only to effect said repositioning said plunger means upon wear of said pad means.

5. The brake of claim 4 in which said actuating means comprises a parking brake lever pivotally mounted on said housing, said plunger having an outer portion thereof connected to said lever and an inner portion thereof connected to said pressure plate, and said selective coupling means comprising a one-way detent coupling said outer and inner portions and providing for axial separating movement of said portions into a series of incremental positions.

6. The brake of claim 4 in which said actuating means comprises a spring housing, a compression spring received within said spring housing, a piston received in said spring housing and movable under the influence of fluid pressure to compress said spring, and cam means carried by said piston in engagement with said plunger and operable to effect said axial plunger movement under the influence of said spring upon the release of fluid pressure to said piston.

* * * * *